United States Patent [19]
Chan et al.

[11] Patent Number: 5,811,507
[45] Date of Patent: Sep. 22, 1998

[54] POLYESTERIMIDES FOR USE IN LINEAR AND/OR NON-LINEAR OPTICS, AND ONE METHOD FOR PREPARING SAME

[75] Inventors: You-Ping Chan, Lyons; Gilles Tapolsky, St Genis Laval; Rémi Meyrueix; Jean-Pierre Lecomte, both of Lyons; Michaël Dickens, St Genis Laval, all of France

[73] Assignee: Flamel Technologies, France

[21] Appl. No.: 628,639

[22] PCT Filed: Oct. 20, 1994

[86] PCT No.: PCT/FR94/01219

§ 371 Date: Nov. 14, 1996

§ 102(e) Date: Nov. 14, 1996

[87] PCT Pub. No.: WO95/11476

PCT Pub. Date: Apr. 27, 1995

[30] Foreign Application Priority Data

Oct. 21, 1993 [FR] France ................................. 93/12783

[51] Int. Cl.[6] .......................... C08G 73/16; C08G 63/685
[52] U.S. Cl. .......................... 528/170; 528/171; 528/172; 528/173; 528/174; 528/176; 528/220; 528/229; 528/271; 528/272; 528/288; 528/292; 528/310; 528/322; 528/350; 528/353; 359/299; 385/2; 385/8; 385/122
[58] Field of Search .......................... 528/172, 173, 528/174, 310, 171, 271, 170, 288, 272, 322, 350, 353, 292, 176, 220, 229; 359/299; 385/2, 8, 122; C08G 73/16, 63/685

[56] References Cited

U.S. PATENT DOCUMENTS 3,179,634  4/1965  Edwards .................................. 528/353
3,356,648  12/1967  Rogers .................................... 528/353

FOREIGN PATENT DOCUMENTS 0 446 717   9/1991  European Pat. Off. .
0 452 604  10/1991  European Pat. Off. .
2 269 556  11/1975  France .
2 657 083   7/1991  France .
91/03001   3/1991  WIPO .
91/13116   9/1991  WIPO .

OTHER PUBLICATIONS

Xu et al., *Macromolecules*, 25, 1992, 6714–6715.
Sotoyama et al., *Applied Phys. Lett.*, 64(17), 25 Apr. 1994, 2197–2199.

Primary Examiner—P. Hampton-Hightower
Attorney, Agent, or Firm—Bacon & Thomas

[57] ABSTRACT

The present invention relates to a new polyesterimide of the type containing ester repeat functional groups E=—CO—O—, imide repeat functional groups I:

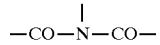

and at least one chromophore, characterized in that it contains a quantity of recurrent amide functional groups capable of ring closure to imides which is smaller than or equal to 5 mol % relative to the sum of the imide functional groups and of the amide functional groups capable of ring closure to imides, which are present, and in that the polymerization functional groups consist essentially of E functional groups.

This polyesterimide is preferably free from amide functional groups capable of ring closure to imides.

One of the processes for obtaining this polyesterimide constitutes another subject-matter of the invention.

Such a polymer is advantageously capable of behaving like a material that is transparent and/or active in nonlinear optics.

It therefore constitutes a raw material of choice for producing LO and/or NLO devices: filters, polarizers, waveguides, a modulator, directional coupler, optical flip-flop and photoconductive film.

28 Claims, No Drawings

POLYESTERIMIDES FOR USE IN LINEAR AND/OR NON-LINEAR OPTICS, AND ONE METHOD FOR PREPARING SAME

TECHNICAL FIELD

The present invention relates to organic materials for application in linear optics and/or in nonlinear optics (LO, NLO). More precisely, it relates to polymers and copolymers containing ester and imide functional groups and including molecules (chromophores) capable of giving rise to nonlinear effects in optics, and to the processes for their manufacture.

The polymers with which the invention is concerned are of the type of those capable of being formed into films or guides for producing optical devices.

PRIOR ART

In the optical and optoelectronic applications of such polymer materials the fact which is exploited is that these macromolecules behave like transparent materials and/or like optically nonlinear materials.

On the macroscopic scale the optically linear or optically nonlinear behaviour of these materials is determined by the susceptibilities. The latter are directly related to the polarization of the material which is induced by an electromagnetic field E and governed by the following fundamental relationship:

$$P = P_0 + {}_{102}{}^1E + \chi^2 EE + \chi^3 EEE + $$

in which:

P and $P_0$: denote, respectively, the polarization in the presence and in the absence of an electromagnetic field, E: represents the electromagnetic field, $\chi^1$: represents the linear susceptibility, $\chi^2$ and $\chi^3$: represent the nonlinear susceptibilities of the material.

The coefficient $\chi^1$ reflects the linear optical behaviour of the material.

Filters, polarizers and waveguides are examples of components employing polymers for their linear optical behaviour.

The coefficients $\chi^2$ and $\chi^3$ reflect, respectively, the activity in nonlinear optics of a nonlinear material of second and third order.

Materials which are active in nonlinear optics are generally used in active components of the modulator, directional coupler, optical flip-flop, photoconductive film and similar type. The activity of these polymer materials in nonlinear optics finds its source in the hyperpolarizable compounds (or chromophores) which they contain.

A chromophore is to be understood to mean any structural unit whose interaction with the electromagnetic field of light gives rise to the optical effect sought after. This effect may take place at resonant or nonresonant wavelengths. The activity of these chromophores in nonlinear optics is given by their hyper-polarizability. The latter is directly related to the molecular dipole moment by the following fundamental relationship:

$$\mu = \mu_0 + \alpha F + \beta FF + \gamma FFF + $$

in which:

$\mu$ and $\mu_0$: represent the dipole moments in the presence and in the absence of an electromagnetic field, respectively, F: represents the local electromagnetic field, $\alpha$ and $\beta$: represent the polarizability and hyperpolarizability coefficients.

The coefficient $\alpha$ is the polarizability coefficient of the chromophore molecule and reflects its activity in linear optics.

Coefficients $\beta$ and $\gamma$ represent the hyperpolarizability coefficients of the first and second order, respectively.

In order to understand better the specifications imposed on the nonlinear-optical (NLO) polymers it is appropriate to recall that linear waveguides consist of a number of layers of polymers deposited successively over one another on a substrate, for example by the known technique of spin coating.

The central layer, with the highest index, constitutes the guiding material. The lateral confinement of light in this central layer is produced by plotting a guide therein by techniques which are known to a person skilled in the art, like, for example, moulding, ion erosion or photobleaching. This last technique, which requires the guiding central layer to have a refractive index that can be modulated by irradiation with light, is preferred by a person skilled in the art. All this assumes that the polymers employed have an absorption and indices which are adjustable (preferably by photobleaching) and stable with time at the temperature of use and of the process.

For more ample details and explanations of the use of polymers for the manufacture of optical and opto-electronic waveguides, reference will be made to the work "Polymers for Lightwave and Integrated Optics", L. A. Hornak, M. Dekker ED., N.Y. (1992), or else the paper by C. C. Teng, Appl. Phys. Lett., 60 (13), 1538 (1992).

It is known, moreover, that in order to be active in NLO, which is equivalent to exhibiting a nonzero or even high nonlinear susceptibility of the first order, and therefore to be capable of being employed in opto-electronic components of the electrooptical modulator type, the hyperpolarizable chromophores must be oriented noncentrosymmetrically in the matrix.

This is generally brought about by polarization of the film under a high electrical field at a temperature close to the glass transition temperature (Tg). The orientation thus induced is subsequently frozen by cooling under the field.

The oriented film obtained is out of an equilibrium state and tends to become disoriented, which limits the lifetime of the optoelectronic component.

Since the film can become warm during its storage or in the course of the stages of welding or of deposition of the metal layers, the thermal stability of the orientation of the chromophores is a crucial characteristic of the polymer.

For further details on these theoretical questions reference will be made to the work by D. S. Chemla and J. Zyss: "Non linear optical properties of organic molecules and crystals", Academic Press, 1987, or to the abovementioned work by L. A. Hornak.

It follows that polymers must satisfy a number of specifications in order to be usable in applications in optoelectronics:

1 The polymers must have the following functional properties:

an absorption and refractive indices which are perfectly controlled and adjustable, preferably by UV photobleaching (waveguides), high nonlinear first and second order susceptibilities, a very low optical attenuation in the window between the maximum absorption length of the chromophore (s) ($\lambda$ max)+150 nm and 2000 nm (transparency).

2 These functional properties must be constant with time and stable to temperature, in order to provide the material with a sufficient lifetime. An optically nonlinear polymer must, advantageously, exhibit, inter alia, a good stability of orientation of the dipoles at elevated temperatures, which, in other words, means having a high Tg.

3 The polymers must have use properties allowing the optoelectronic components to be easily manufactured by standard processes which are known to a person skilled in the art. These use properties are, especially, a sufficient solubility permitting the deposition on a substrate by dipping or spin-coating techniques. In some cases it is also preferable to have a polymer that is insoluble or insolubilizable after deposition, in order to permit the manufacture of multilayers.

The stability of orientation of the dipoles referred to in the specification No. 2 above is a parameter that is crucial for the polymers in question, with regard to the nonlinear optics application.

In fact, given that the orientation under a high electrical field is performed at a temperature that is higher than or equal to the glass transition temperature Tg of the polymer, it is clear that the latter will be proportionately less subject to the relaxation/dipole disorientation phenomenon the higher its Tg.

This therefore limits the choice of the polymer matrices to the materials which are thermochemically stable at elevated temperatures close to the Tg, so as to avoid any decomposition during the polarization. It should be noted that this property is also of importance in linear optics because, in this field, the devices (e.g. waveguides) are used in optoelectronic circuits and have to withstand severe heat stresses. Now, a possible degradation of the polymer would be accompanied by a change in its refractive index and a decrease in its transparency, and this, of course, would severely impair its technical qualities.

Most of the known polymers which can be employed in linear optics and/or in nonlinear optics have Tg values lower than 150° C. They therefore become disoriented too rapidly at the temperatures of application (85°–125° C.). It should be known that, among these known polymers, prominence is given to those in which the active chromophore is covalently bonded to the polymer chains (within the chains or in a laterally pendant manner) and those in which the chromophore is dissolved (guest-host system).

To try to satisfy this specification No. 2 without sacrificing specifications Nos. 1 and 3 it has been proposed to use polyesterimides.

Thus, Wu et al. describe, in Appl. Phys. Lett., 58 (3), 21 Jan. 1991, p. 225–227, polarized electro-optical polymers consisting of polyimides, and in which a chromophore is dissolved (guest-host system). These polyimides are conventionally obtained by reaction of an aromatic dianhydride and of a diamine, resulting in a polyamide prepolymer. The conversion into polyimides is performed by ring closure (—CO—NH— and —COOH) at very high temperature. These polyimide matrices have high Tg values (higher than 200° C.) and are thermally stable to temperatures of the order of 350° C. However, this prior system suffers from great disadvantages, related:

on the one hand, to the guest-host nature:
the mass percentage of active chromophores is necessarily limited to 20–25%, so as to avoid a macroscopic phase separation which promotes head-to-tail pairing of the chromophores. A result of this is the decrease in the orientability and/or the creation of light-scattering regions, the chromophores dissolved in the matrix act as a plasticizer and, consequently, lower the intrinsic Tg of the polymer, the orientation of the chromophores, which is induced by polarization, is relaxed more easily in the course of time than that of the chromophores covalently bonded to the polymer chains, and, on the other hand, more specifically to the polymer type:

the synthesis of the polyimides and, in particular, the imidization (by ring closure of the amide and acidic functional groups of the prepolymer) requires high temperatures (higher than or equal to 300° C.), which most of the known chromophores do not withstand (deterioration, sublimation). They thus lose their transparency and their activity in nonlinear optics.

EURO-PCT Patent Application WO-A-91/03 001 (EP 0 438 557) discloses polyimides which are active in nonlinear optics, originating from the high-temperature imidization of polyamide prepolymers produced by condensation of a comonomer of the aromatic anhydride type and of a comonomer of the diamine type, one of the two comonomers being a carrier of an NLO chromophore.

As indicated in Wu et al., mentioned above, as well as in U.S. Pat. No 3,179,634, U.S. Pat. No. 3 356 648 and in Feger et al. Polymers in Information Storage Technology, Publ. Mittal Plenum Press, N.Y., 1989, p. 229, this imidization (—NH—CO—/—COOH ring closure) involves keeping the polymer for several hours at temperatures higher than or equal to 300° C. While such conditions are necessary to obtain a total imidization, they are detrimental to the chromophores that are effective in NLO, which have the disadvantage of being heat-sensitive.

This is the reason why, in the synthesis of polyimides according to WO-A-91/03 001, care is taken not to plan imidization temperatures that are higher than 200°–220° C. As a result, a considerable fraction of the amide/COOH functional groups of the precursor polyamide prepolymers is not converted into imide functional groups. A direct repercussion of this, however, is that it gives the polymer mediocre optical properties and a high tendency to water uptake, and this further impairs the said optical properties.

It is, moreover, well known that the imidization of polyamides is accompanied by water formation. Now, the latter can give rise to the formation of microvoids which take part in the attenuation of the LO and NLO properties [cf. paper by H. Franke published in "Polymers for lightwave and integrated optics" (Ed. Hornak, Marcel Dekker, Inc., N.Y., 1992, p. 207)].

In such a technical environment one of the essential objectives of the present invention is to provide a polymer/chromophore system that can be employed in LO and/or in NLO, corresponding to the specifications 1 to 3 above and, in particular, characterized by:

a high thermochemical stability at high temperatures, a high Tg, good mechanical behaviour, a transparency which is adjustable and sufficient at the conventional wavelengths, solubility permitting varied and easy forming operations, ease of synthesis, a low cost of manufacture, and high NLO activity.

Another objective of the invention is to propose a process for the preparation of a polymer/chromophore system, especially of the type outlined above, which is economical, easy to implement, productive and characterized by high yields.

BRIEF DESCRIPTION OF THE INVENTION

To attain these objectives, among others, the Applicant Company has been credited with:
- finding new polymers, of the type of those:
  - which include ester E and imide I repeat functional groups and at least one chromophore,
  - which are substantially free from repeat amide functional groups capable of ring closure to imides,
  - and in which the polymerization functional groups are E functional groups.
- These new polymers are polyester imides (PEI).

The Applicant Company has also been credited with developing a polyesterification directly producing polyesterimides of the abovementioned type.

BEST WAY OF CARRYING OUT THE INVENTION

The present invention thus relates to a polyesterimide which can be employed in linear optics and/or in nonlinear optics, of the type containing ester repeat functional groups (E)=—CO—O—, imide repeat functional groups (I):

and at least one chromophore, characterized:
- in that it contains a quantity of recurring amide functional groups capable of ring closure to imides that is lower than or equal to 5, preferably 3 and, still more preferably, 1 mol % relative to the sum of the imide functional groups and of the amide functional groups that are capable of ring closure to imides and which are present, and
- in that the polymerization functional groups consist essentially of E functional groups.

Furthermore, the subject-matter of the invention is a process for the preparation of a polyesterimide which can be employed in linear optics and/or in nonlinear optics, of the type containing at least one chromophore, characterized in that it consists in carrying out a polyesterification with the aid of comonomers at least one of which contains at least one, preferably one or two, cyclized imide functional group(s).

These new polymers, which have a Tg and a thermochemical stability which are high, additionally exhibit all the other expected advantages.

The polymers of the invention may be, equally well, homopolymers, copolymers, oligomers and cooligomers of variable degree of polymerization. They may be polymers with linear and/or branched and/or crosslinked chains.

Within the meaning of the present invention a chromophore is intended to mean any molecule that is active in NLO, that is to say whose interaction with the electromagnetic field of the light gives rise to the optical effect which is sought after at wavelengths which are resonant or otherwise. In the present description a chromophore is represented by the following schematic formula: D.π.A, in which:
- D=electron-donor group,
- A=electron-acceptor group,
- π=transmitter group with delocalized π electrons.

In accordance with a preferred embodiment of the invention the polyesterimide contains, substantially, only recurrent imide functional groups I.

In general, the polyesterimides according to the invention contain chromophores of identical or different structures, ester repeat functional groups E, recurrent imide functional groups I and filling radicals $R^r$, consisting of hydrocarbon groups, preferably alkyl and/or cycloalkyl and/or aryl and/or alkenyl and/or alkynyl and/or cycloalkenyl and/or cycloalkynyl, $R^r$ being more preferably chosen from $C_5$–$C_6$ cycloalkyls or alkenyls and/or from aromatics.

Advantageously, each chromophore is bonded to a polymer main chain by at least one covalent bond, it being possible for the link to be envisaged via only one of the two ends of the chromophore with the aid of one or two arms (pendant lateral/main chain form) or via both ends of the chromophore (coaxial/main chain form).

The ester functional groups E are those constituting the polymerization functional groups, forming bridges between the recurrent units in the main chains of the polymers. This does not exclude the possibility of their presence in other areas in these recurrent units.

The recurrent imide functional groups I are advantageously cyclized, with the result that each of them forms a recurrent imide unit I of formula:

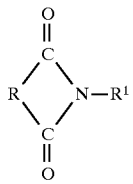

in which:
- R is an aromatic, a linear or branched alkyl, a cycloalkyl, a linear or branched alkenyl or a cycloalkenyl, a linear or branched alkyne or a cycloalkynyl, it being optionally possible for the said radicals to be substituted,
- $R^1$ denotes an aliphatic, an alicyclic or an aromatic.

These functional groups or units are carried, equally well, coaxially as a main chain and/or in the form of pendant groups.

To define the class of polyesterimides with which the invention is concerned, it is possible to refer to the schematic general formula Fg of a recurrent unit, which is given below:

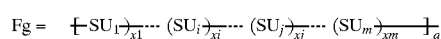

$m \geq 1$,
$\Sigma_{x_i} = 1 (i=1 \text{ to } m)$
$n \geq 1$, in which the $SU_i$ (i=1 to m) are chemical sequences formed by elementary units chosen from the following groups: I, DπA, E and $R^r$, and all of the subunits constituting the recurrent unit containing at least one ester functional group E, at least one imide functional group I, at least one chromophore DπA and, optionally, at least one filling unit $R^r$ consisting of a hydrocarbon group, preferably alkyl and/or cycloalkyl and/or aryl and/or alkenyl and/or alkynryl and/or cycloalkenyl and/or cycloalkynyl and/or aromatic.

In accordance with the invention, three classes A, B, C, of chemical sequences are counted to which the subunits $SU_i$ (i=1 to m) are liable to belong:

A=.E.DπA.E.I.
B=E.DπA.E.R',
C=E.R'.E.I.

It should be noted that the same single recurrent unit may contain different chemical varieties of units I, DπA and of radicals $R^r$.

According to a first declension of the formula Fg, the polyesterimide is a homopolymer consisting of a recurrent unit in which $SU_1$ belongs to the class A, with each of DπA and I corresponding to one and the same chemical variety.

In accordance with a second declension of Fg, the polyesterimide is a copolymer in which the recurrent unit contains at least two subunits $SU_1$, $SU_2$, all belonging to the class A, but with DπA and/or I corresponding to at least two different chemical varieties, e.g.:

$SU_1$=E–DπA-E-I (class A),
$SU_2$=E–DπA'-E-I'(class A')

In accordance with a third declension of Fg, the polyesterimide is a copolymer in which the recurrent unit contains at least two subunits $SU_1$, $SU_2$ belonging, respectively, to the classes A and B. It is therefore a recurrent unit of AB type.

In accordance with a fourth declension of Fg, the polyesterimide is a copolymer in which the recurrent unit contains at least two subunits $SU_1$, $SU_2$ belonging, respectively, to the classes A and C. It is therefore a recurrent unit of AC type.

In accordance with a fifth declension of Fg, the polyesterimide is a copolymer in which the recurrent unit contains at least two subunits $SU_1$, $SU_2$ belonging, respectively, to the classes B and C. It is therefore a recurrent unit of BC type.

In accordance with a sixth declension of Fg, the polyesterimide is a copolymer in which the recurrent unit contains at least three subunits $SU_1$, $SU_2$, $SU_3$ belonging, respectively, to the classes A, B and C. It is therefore a recurrent unit of ABC type.

In these six declensions it is appropriate to consider that the recurrent unit contains at least one subunit $SU_i$ carrying DπA (A or B) and that $x_i$ is greater than or equal to 0.05, preferably 0.15 and, still more preferably, 0.3.

In accordance with an advantageous arrangement of the invention, the polymers PEI may be seen to be endowed with crosslinkability by incorporation of crosslinking groups GR in the main chains, in a coaxial or laterally pendant manner, or else at the chain ends.

The groups GR are carried by at least one of the subunits $(SU_i)_{xi}$(i=1 to m) and/or by at least one of the ends of the polymer chains.

Insofar as one subunit SU may contain E and/or I and/or $R^r$ and/or DπA, GR may be bonded to at least one imide functional group I and/or to at least one chromophore DπA.

With regard to the nature of the groups GR, it may be specified that they are chosen from the reactive groups containing one double bond and/or one triple bond (CC, CN) and/or one strained ring of the cyclobutene or epoxy type and their derivatives, preferably from those listed below:

maleimide, nadimide, acrylic, methacrylic, acrylaamide, vinyl, styryl, allyl, silyl, cyanate, isocyanate, thiocyanate, cyanamide, nitrile, epoxy, acetylene, benzocyclobutene or their derivatives.

Other examples of crosslinking groups GR, in particular of divalent nature, are given below:

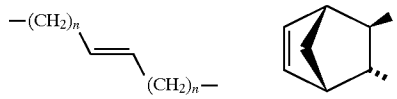

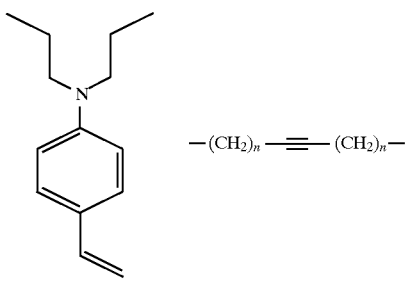

These groups GR crosslink, either directly between them, or through the intermediacy of a crosslinking auxiliary. Thus, in accordance with the invention, at least a proportion of the crosslinkable groups GR are capable of reacting with at least one crosslinking auxiliary, the latter being preferably a multifunctional compound containing OH and/or COX functionality, with X=OH, halogen (Cl), alkoxy ($OCH_3$,— O—phenyl) capable of reacting, respectively, with COX and OH functional groups belonging to GR.

By way of examples of crosslinking auxiliaries there may be mentioned: ethylene glycol diacrylate, ethylene glycol dimethacrylate, divinylbenzene, phenyl diisocyanate, dimaleimidodiphenylmethane, pentaerythritolriacrylate, pentaerythritoltetroltetramethacrylate, tris(2-acryloxyethyl) isocyanurate or the hexamethylene diisocyanate trimer or triphenylmethane triisocyanate.

In the case where the GR groups contain reactive functional groups consisting of OH and/or COX, X=OH, halogen such as Cl, alkoxy such as OMe, OΦ(Φ=phenyl), the crosslinking auxiliary may be, for example, a tricarboxylate such as 1,3,5-benzenetricarboxylate, a trialcohol or a polyol.

This aptitude of the polymers of the invention to crosslink enables them to be made insoluble, e.g. by heat and/or photochemical treatment. This is particularly advantageous in the deposition of successive layers of polymers in order to produce electrooptical devices and, especially, in the manufacture of waveguides by lithography.

The DπA chromophores which can be employed within the scope of the invention may be of any kinds that are appropriate and known per se, such as those defined and exemplified in the paper by H. E. Katz, C. W. Dirk, K. D. Singer and T. E. Sohn "Mol. Cryst. Liq. inc. non lin. opt." (1988), 157, 525 and in the French Patent Applications which have the following numbers: 88-05 214, 88-12 028, 88-12 079, 88-12 080, 89-02 271, 89-04 232, 89-05 870, 89-10 696, 89-10 197, 89-00 377, 90-00 575, 90-02 336, 90-05 420. It is, nevertheless, preferable to select those containing at least one, preferably two, functional groups that are reactive by esterification, for example: OH and COX, with X=halogen, aryl, alkyl or OH.

In accordance with the invention the chromophores which give the best performance in NLO are adopted and, especially, those of the diazo, stilbene, alkene or alkyne type.

The following structures may be mentioned by way of examples:

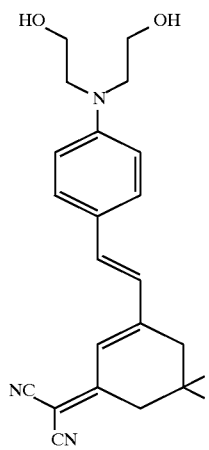

Chr 1

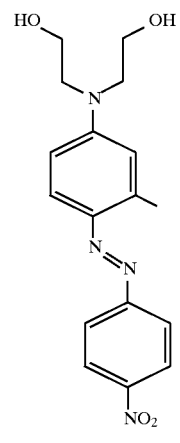

Chr 2

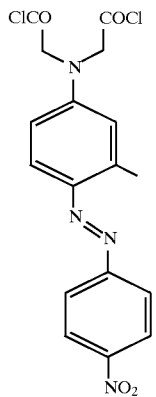

Chr 3

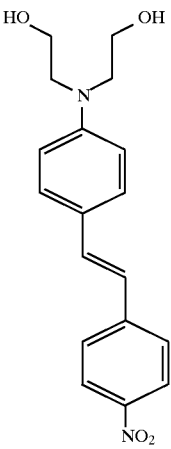

Chr 4

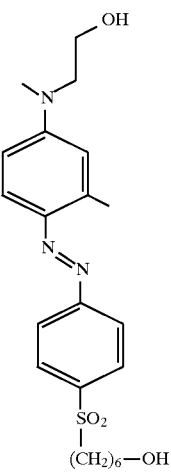

Chr 5

These chromophores are described in the following patents or papers: EP 0 364 313 (Chr 1), Meyrueix et al., "Organic Molecules for NLO and Photonics", Publ. Messier et al., Kluwer Academic Publishers 1991, p. 161 (Chr 2), Yu et al., Macromolecules, 1992, 25, 2609 (Chr 3), EP 0 350 112 (Chr 4) and Xu et al., Macromolecules, 1992, 25, 6716 (Chr 5).

According to a characteristic of the invention, the number of chromophores $D\pi A$ per recurrent unit is greater than 0 and smaller than or equal to 1. It suffices for $D\pi A$ to be present in at least one of the subunits $SU_1$ to $SU_m$. In the subunits from which it may be absent $D\pi A$ is replaced by a radical R, preferably dialcoholic and/or dicarboxylic.

It is therefore quite possible to adjust at will the proportion of chromophores in the polymer. This has the advantage of permitting a fine control of the physical properties of the polymers, such as the NLO activity, the transparency, the refractive index, the Tg and the solubility.

It has been seen above that the group(s) GR may be carried by the chromophores $D\pi A$. A number of them are known products. By way of examples there may be mentioned those disclosed in Xu et al., Macromolecules, 1992, 25, 6714 and Xu et al., SPIE organic materials San Diego, July 1993 (1853–22) and, in particular, those listed below:

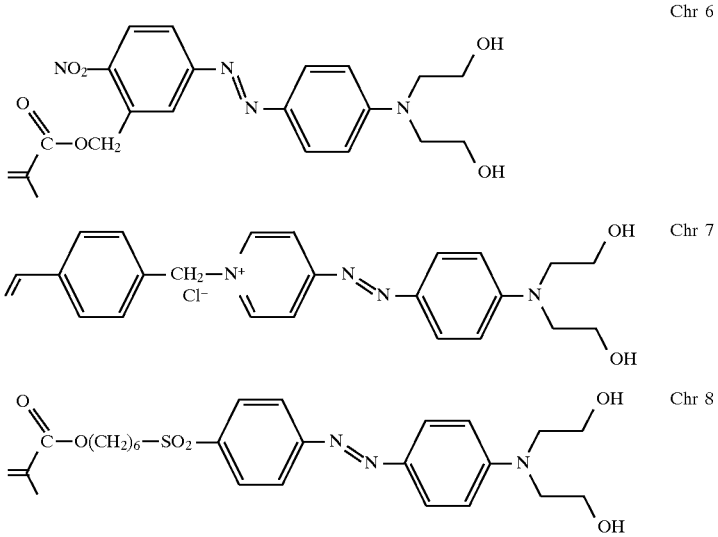

It should be emphasized that the covalency of bonding of the chromophores DπA to the polymer chains, as well as a possible crosslinking, are factors which make it possible to limit the residual mobility of the said chromophores and, as a result, to increase the stability of orientation of the polymers once they are polarized and frozen.

The imide units I:

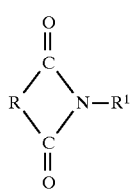

in the PEI according to the invention may be of mono-, di- or polyimide, preferably mono- or diimide, type. It is the radical R that contains the imide rings beyond the first one.

Examples of imide units I, which, it will be recalled, may be coaxial or pendant in relation to the main chains, are given below:

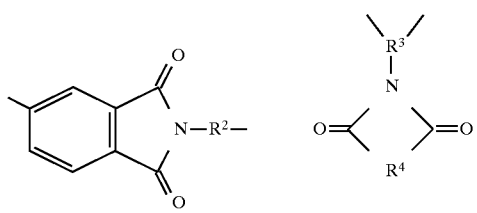

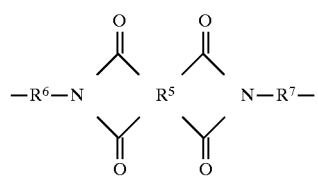

-continued

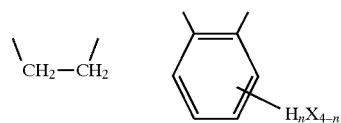

in which:

$R^2 = R^1$ in the formula of the unit I: aromatic group (e.g. $C_6H_nX_{4-n}$, n=0 to 4, X=$CF_3$, $CH_3$, F, Cl, Br) or aliphatic group (e.g.: $-(CH_2)_n-$, n=1 to 6), $R^3 = R^1$ in the formula of the unit I: aromatic group (e.g.: $C_6H_nX_{3-n}$, n=0 to 3, X=$CF_3$, $CH_3$, F, Cl, Br), $R^4 = R$ in the formula of the unit I:

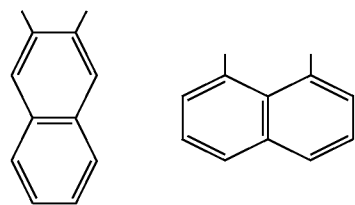

with X=F, Cl, Br, $CH_3$, $C_2H_5$, $C_6H_5$, $CF_3$ (n=4 to 0), $R^5$=:

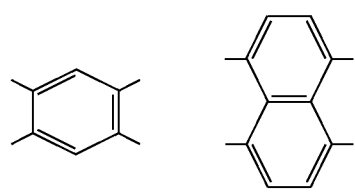

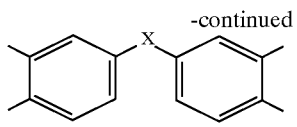

with X=direct bond, O, CO, S, SO$_2$, CH$_2$, C(CF$_3$)$_2$, C[CF$_3$(C$_6$H$_5$)], P(O)(C$_6$H$_5$), R$^6$, R$^7$ and R$^8$=R$^1$ in the formula of the unit I being identical or different from each other and corresponding to the same definition as that given for R$^1$ or R$^2$.

As follows from the general formula of the PEI of the invention given above, the number of unit I per recurrent unit is smaller than or equal to 1 and greater than 0.

In accordance with an alternative form of the invention referred to above, the imide units I may be carriers of crosslinking groups GR.

The radicals whose formulae are given below are non-limiting examples of groups I-GR.

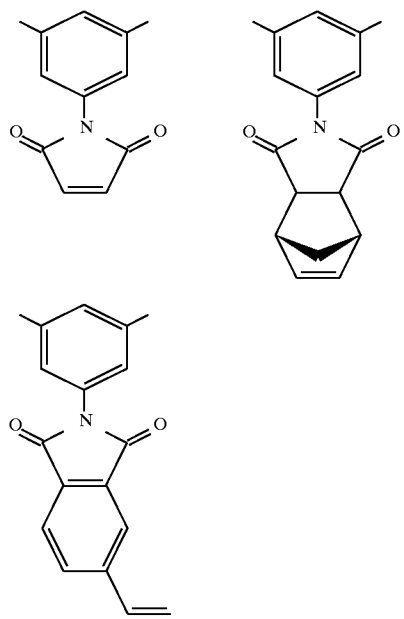

In accordance with an advantageous arrangement of the invention, the mass of a PEI according to the invention is greater than or equal to 1000 D, preferably between 1000 and 200000 D and, still more preferably, between 3000 and 70000 D.

The present invention has, moreover, as its subject-matter new PEI one of whose essential and original characteristics is that of being the product of a polyesterification of comonomers at least one of which contains at least one, preferably one or two, optionally cyclized, preferably cyclized, imide functional group(s).

These PEI can be employed in linear optics and/or in nonlinear optics. They therefore comprise a chromophore DπA which is present on or which constitutes at least one of the comonomers referred to above.

The present invention also relates to a process for the preparation of a polyesterimide of the type containing at least one chromophore, according to which a direct synthesis of polyester is carried out starting from comonomers at least one of which contains at least one imide functional group I:

$$-CO-\overset{|}{N}-CO-$$

or an imide unit:

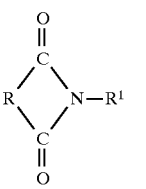

The chromophore(s) is (are) carried or, itself (themselves) too, constitutes at least one of the comonomers.

It is therefore a polyesterification in which comonomers are used each of which has at least two, identical or different, polymerization functional groups of the acidic or alcohol type.

In accordance with a preferred embodiment of this process a proportion of the comonomers carries two alcohol functional groups, whereas the other proportion thereof is provided with two functional groups of carboxylic or derived nature: COX, with X=OH, halogen such as Cl, Br or F, or alkoxy such as O—Me or O—Ph.

Still more preferably, the condensation of a dialcohol and of a diCOX, like, for example, an acid dichloride or a diester (—COOCH$_3$, —COOC$_6$H$_5$) is performed in the presence of at least one organic solvent chosen advantageously from amides, cyclic ethers, nitrogenous solvents, chlorinated solvents, aromatics and their mixtures. Dimethylacetamide or N-methylpyrrolidone, tetrahydrofuran, chloroform, 1,2-dichloroethane and chloro- and dichlorobenzene are examples of preferred solvents.

At least one, preferably nitrogenous, base, including especially pyridine or triethylamine, may be added to the reaction mixture.

More precisely, but still without any limitation being implied, one of the comonomers may be a dialcoholic or diCOX (dicarboxyl) chromophore and the other an imide unit (I), of the same type as those defined above and containing two polymerization functional groups, carboxylic (COX) and hydroxyl, respectively.

This condensation is performed in solution or in bulk in conditions that are known to a person skilled in the art (for example, the review by Pilati in "Comprehensive Polymer Science", Ed. Allen et al., Pergamon Press, 1989, vol. 5, p. 275 may be consulted.

According to an advantageous alternative form of implementation of the process according to the invention, at least one starting comonomer is used containing at least one crosslinking group GR and/or at least one crosslinking group GR is grafted onto at least one of the starting comonomers in a preliminary stage or subsequently onto the polymer, the said GR groups being, finally, located:

either within the polymer chains, or laterally (pendant GR) relative to the polymer chains, or on at least one of the ends of the polymer chains.

These GR groups are identical or different from each other and may be selected, preferably, from the same classes of radicals and the same radicals as those listed in the above description of the crosslinkable PEI.

According to another advantageous characteristic of the process of the invention the polyesterimides synthesized by polycondensation or polyesterification are subjected to a postpolymerization treatment at a high temperature, preferably higher than or equal to 100° C., preferably 120° C. and, still more preferably, of between 180° and 350° C. and lower than the thermal decomposition temperature of the polymers.

This postpolymerization is preferably performed under vacuum or under a stream of inert gas, e.g. of argon or nitrogen and on the pure polymers, in the solid or molten state. It is, for example, applied to films or in bulk.

The postpolymerization may optionally be performed with the aid of a titanium- or zirconium-based catalyst.

The effect of this treatment is to increase the mass of the polymers. This is advantageous, in particular, for increasing the Tg and improving the ductility of the material.

The recurrent units capable of being polycondensed or polyesterified by this process may be of the type defined above with their alternative forms in the description of the new PEI constituting another subject-matter of the invention.

Thus, the recurrent units may contain one or more subunits optionally comprising filling radicals R$^r$ defined above, in addition to the functional groups E, the units I the groups GR and the chromophores DπA.

It can therefore be envisaged to synthesize copolymers while varying the relative proportions of the constituents E, I, GR, DπA and R$^r$, while modifying the nature and the content of the subunits and their relative percentages. The location of the functional groups I, of the groups GR and of the chromophores DπA may also be variable.

The properties of the polymers obtained by the present process can be deduced, by analogy, from those described above for the new PEI according to the invention.

The process according to the invention constitutes one way, among others, to obtain these new PEI.

The PEI according to the invention can be oriented in an electrical field E (e.g. 10 to 400 V/μm) at a temperature close to Tg. The orientation thus acquired can be subsequently frozen by cooling under the field E. The invention also relates to the polymers thus obtained.

These "oriented" polymers advantageously have an electrooptic coefficient $r_{33}$ which is higher than or equal to $1\times10^{-12}$, preferably $5\times10^{-12}$ and, still more preferably, $10\times10^{-12}$ m/V, in the case of a polarizing voltage of the order of 100 V/μm.

INDUSTRIAL APPLICATION OF THE INVENTION

Finally, the invention makes it possible to gain access to new polymer materials that can be employed in linear optics and/or in nonlinear optics, one of the winning advantages of which is that they have high glass transition temperatures, i.e. higher than 130° C.

As a result, they have a high stability of orientation of the chromophores. Being easy to prepare and to use (solubility for film-forming), these polyesterimides are also endowed with excellent mechanical and optical properties (transparency λ max+150 nm–2000 nm, high nonlinear susceptibilities of the 1st and of the 2nd order, adjustable refractive index).

These PEI can be applied directly for the production for components of LO devices of the filter, polarizer, waveguide or similar type, or of components which are active in NLO devices, of the modulator, directional coupler, optical flip-flop and photoconductive film type.

The present invention also relates to these applications of the PEI, that is to say of the LO and/or NLO devices produced at least partially with at least one of the said PEI.

Other advantages and alternative forms of the PEI according to the invention will emerge clearly from the examples which follow and which describe the synthesis of the PEI 1 to 8. their applications in linear optical and electrooptical devices and the LO and NLO properties which they develop in these devices.

EXAMPLES

A number of examples of synthesis of polyesterimides (PEI) according to the invention are given below.

Example 1

Synthesis of PEI 1.

This example relates to the synthesis of a linear polymer containing the Chr 1 and a monoimide as a pendant group. The synthesis takes place in accordance with the following reaction scheme:

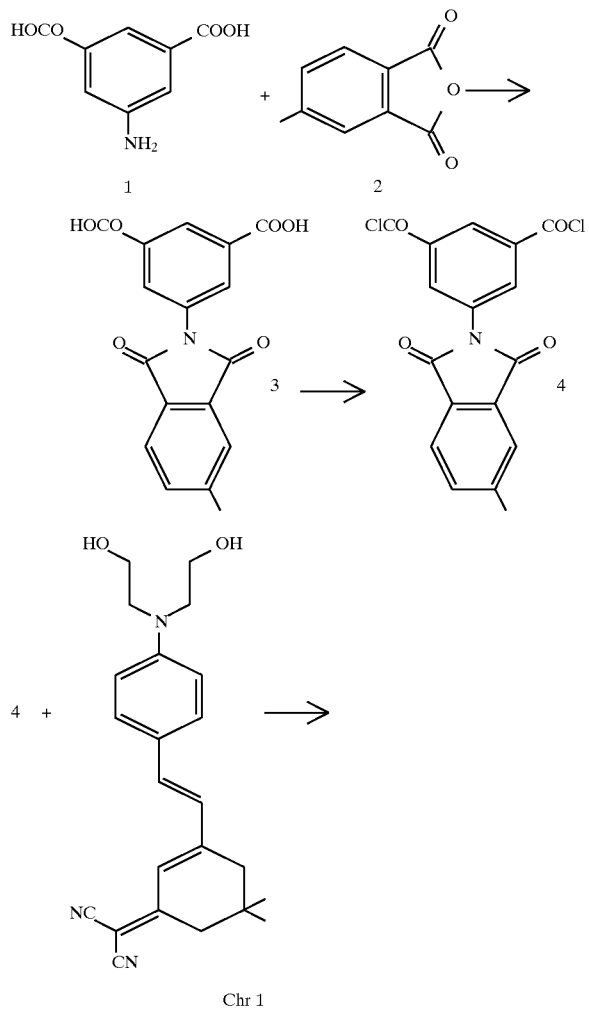

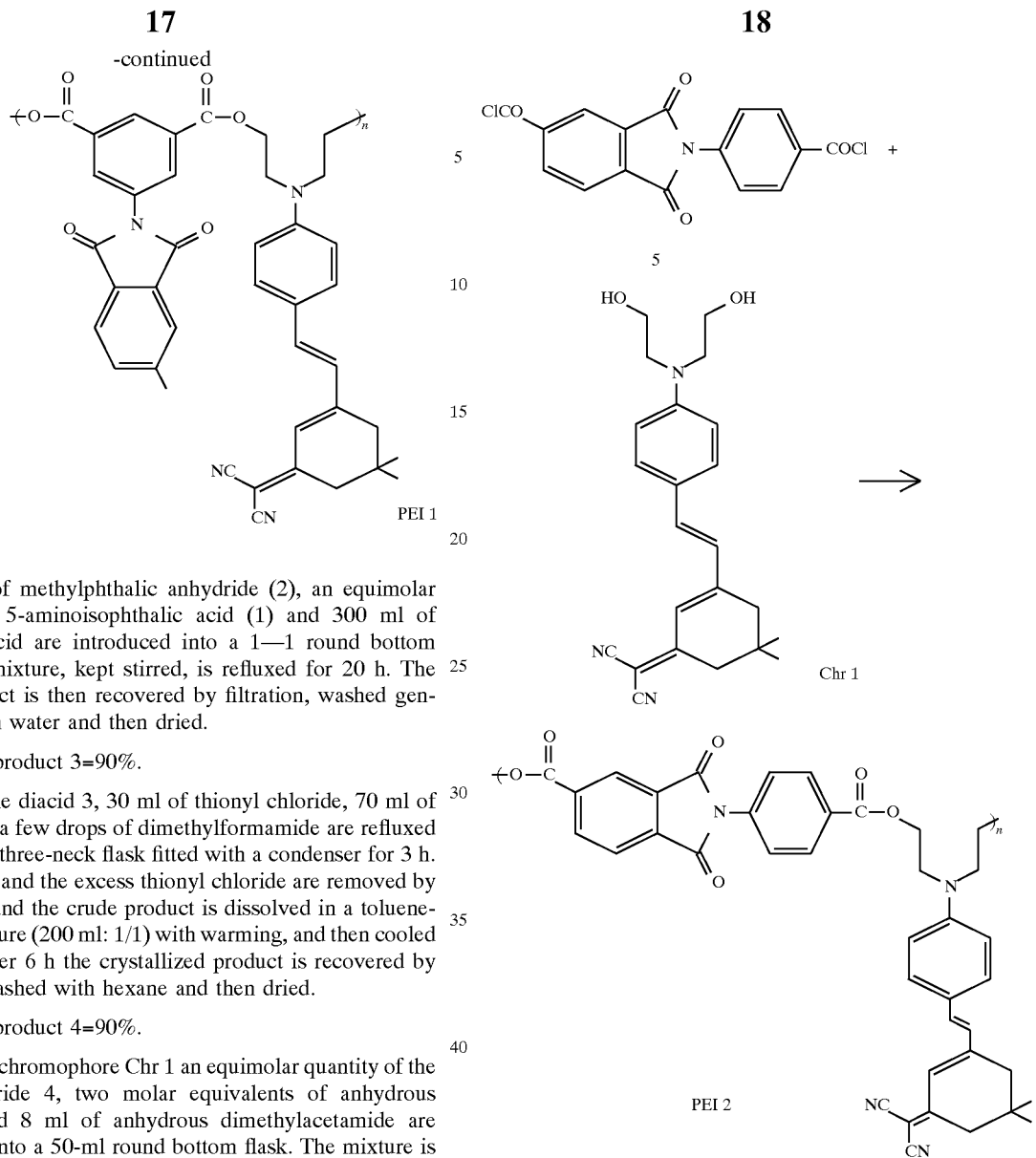

11.47 g of methylphthalic anhydride (2), an equimolar quantity of 5-aminoisophthalic acid (1) and 300 ml of propionic acid are introduced into a 1—1 round bottom flask. The mixture, kept stirred, is refluxed for 20 h. The white product is then recovered by filtration, washed generously with water and then dried.

Yield of product 3=90%.

11 g of the diacid 3, 30 ml of thionyl chloride, 70 ml of toluene and a few drops of dimethylformamide are refluxed in a 250-ml three-neck flask fitted with a condenser for 3 h. The toluene and the excess thionyl chloride are removed by distillation and the crude product is dissolved in a toluene-hexane mixture (200 ml: 1/1) with warming, and then cooled to 0° C. After 6 h the crystallized product is recovered by filtration, washed with hexane and then dried.

Yield of product 4=90%.

3 g of the chromophore Chr 1 an equimolar quantity of the acid dichloride 4, two molar equivalents of anhydrous pyridine and 8 ml of anhydrous dimethylacetamide are introduced into a 50-ml round bottom flask. The mixture is heated to 80° C. and left for 3 h with stirring. 0.5 ml of methanol is added to the reaction mixture and stirring is allowed to continue for half an hour. The solution is then poured into 200 ml of vigorously stirred methanol. The precipitated polymer is then recovered by filtration, washed with methanol and then vacuum-dried at 70° C. for 20 h. The polymer is soluble in dimethylacetamide, N-methylpyrrolidone, chloroform and tetrahydrofuran and is insoluble in heptane, diethyl ether and ethanol. Yield= 95%, Mw=14,000, Tg measured by DSC=175° C.

Example 2

Synthesis of PEI 2.

This example relates to the synthesis of a linear polymer containing the Chr 1 and a monoimide in a main chain. The synthesis takes place in accordance with the following reaction scheme:

The acid dichloride 5 is synthesized in accordance with the method described in the paper by Pardey et al., Macromolecules, 1992, 25, 5060. The polymer is synthesized and isolated as described in Example 1. Yield=92%, Mw=14,000, Tg=175° C.

Example 3

Synthesis of PEI 3.

This example relates to the synthesis of a linear polymer containing the Chr 1 and a diimide in a main chain. The synthesis takes place in accordance with the following reaction scheme:

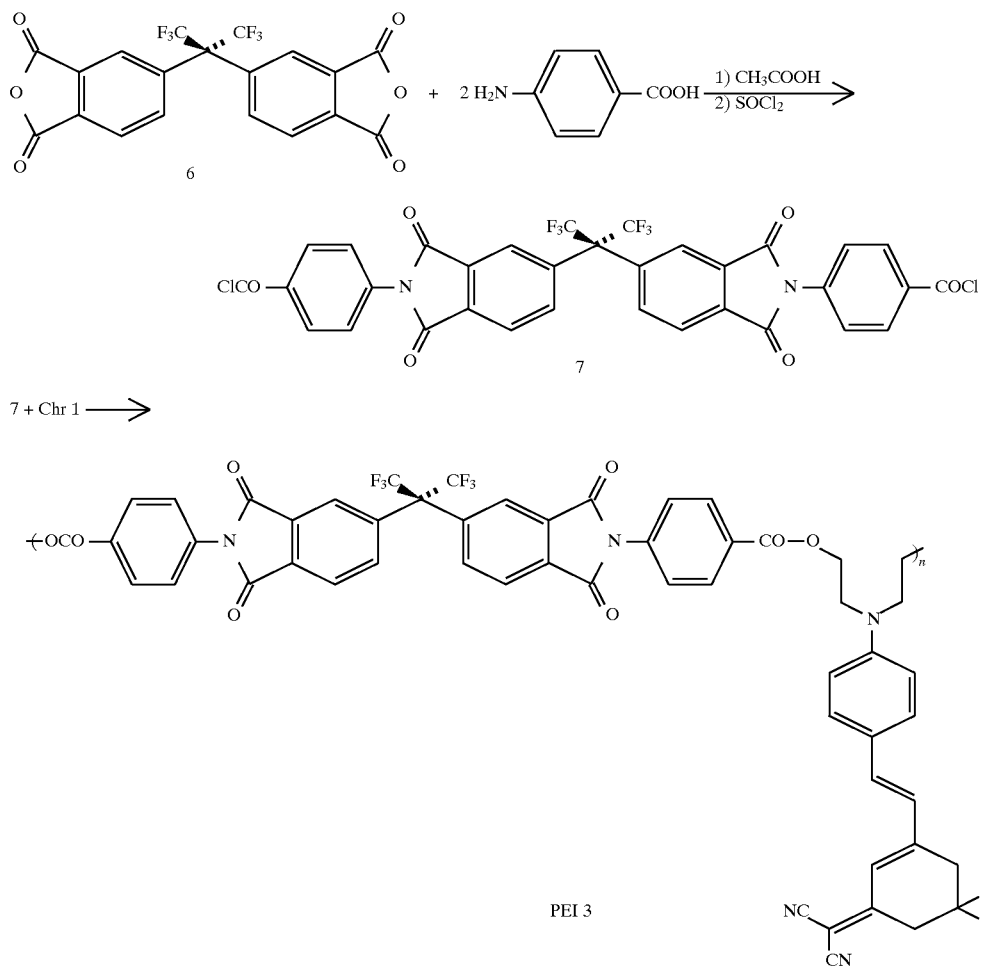

The acid dichloride 7 is synthesized by reaction of the fluorodianhydride with two equivalents of p-aminobenzoic acid, followed by a reaction with an excess of thionyl chloride. The polymer PEI 3 is synthesized as described in Example 1. Yield=95%, Mw=6300, Tg=187° C.

Example 4

Synthesis of PEI 4.

This example relates to the synthesis of a linear polymer containing the Chr 2 and a dumide in a main chain. The synthesis takes place in accordance with the following scheme:

7 + Chr 2 ⟶

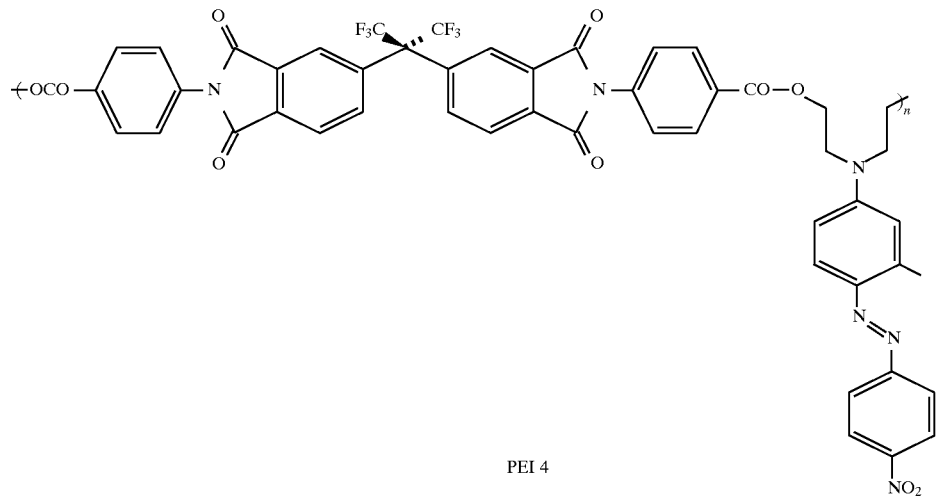

PEI 4

The polymer is synthesized by reacting an equimolar quantity of acid chloride 7 and of chromophore Chr 2 (marketed under the name "Disperse Red 17" by Vilmax) in dimethylacetamide at 60° C. for 10 h in the presence of two molar equivalents of pyridine. The polymer is then isolated by precipitation into methanol and then vacuum-dried at 60° C. for 48 h.

Yield=85%, Tg=183° C, Mw=11,000.

Exmaple 5

Postpolymerization of PEI 1.

1 g of PEI 1 (Example 1: Mw=10,000, Tg=175° C.) is heated under vacuum ($10^{-2}$ mm Hg) at 200° C. for 1 h and then at 250° C. for 2 h. The polymer thus recovered has an Mw of 18,000, a Tg of 180° C. and is soluble in dimethylacetamide, N-methylpyrrolidone and chloroform. The postpolymerization may also be advantageously performed on a film deposited on a substrate (glass, silicon, silica, metal or polymer) to improve the mechanical properties of the polymer.

THERMAL STABILITY OF THE POLYMERS PEI 1 AND PEI 4

The thermostability of the polymers is determined by UV-visible spectroscopy of a film of approximately 0.3 microns and deposited on glass and then vacuum-dried at 150° C. for 12 h and finally subjected to a heat treatment at 200° C. for 2 h under vacuum, and another at 250° C. for 2 h. In the first case a drop in the optical density of the maximum peak of approximately 1% is observed and, in the second case, a drop of approximately 5%.

Exmaple 6

Synthesis of PEI 5.

This example relates to a copolyesteriide synthesized from the chromophore Chr 2 and a 60/40 mixture of acid dichloride 8 (shown below and synthesized in the same way as the acid dichloride 4) and from terephthaloyl dichloride.

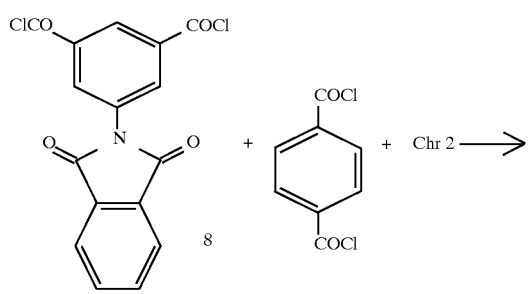

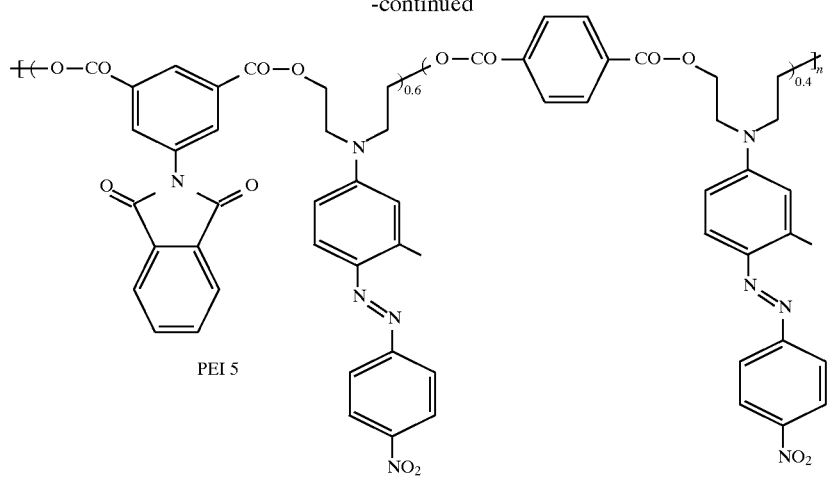

PEI 5

The polymer is synthesized in tetrahydrofuran by reacting 8 mmol of Chr2, 4.8 mmol of 8 and 3.2 mmol of terephthaloyl dichloride in the presence of 16.4 mmol of triethylamine under reflux for 4 h. The solution is filtered and then poured into 300 ml of methanol which is kept stirred. The polymer is recovered by filtration and then vacuum-dried at 50° C. for 24 h. Yield=82%, Mw=17,000, Tg=152° C.

Exmaple 7

Synthesis of PEI 6.

This example relates to the synthesis of a copolyesterimide synthesized from the acid dichloride 5, a 70/30 mixture of chromophore Chr 1 and the dialcohol 9.

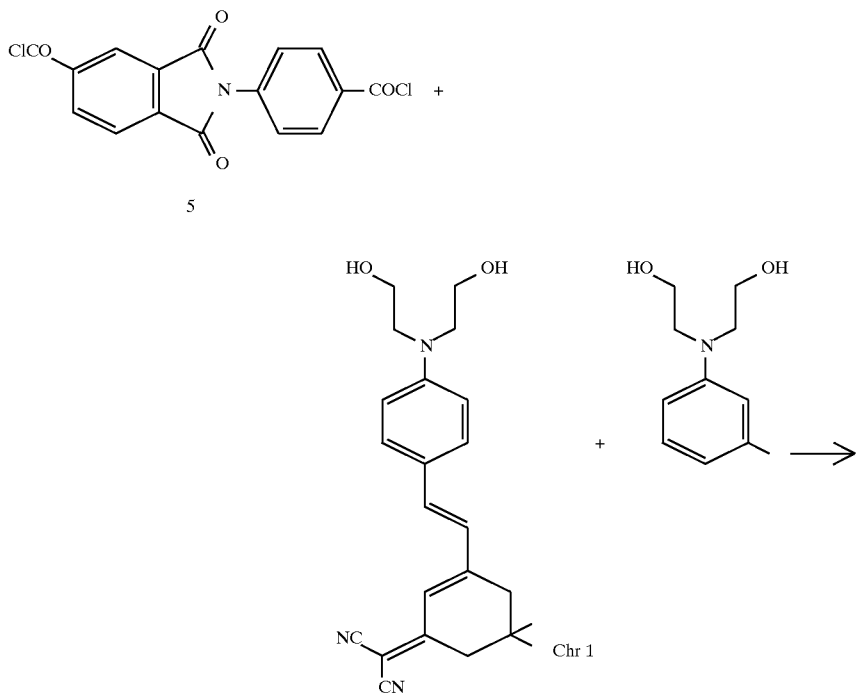

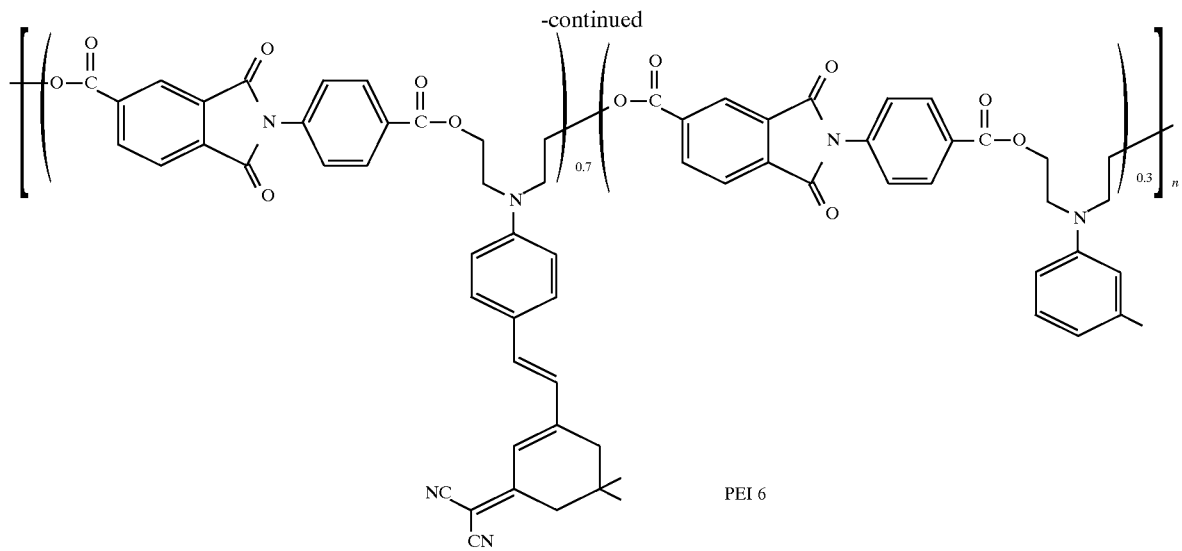

This copolymer is synthesized as in Example 1 by reacting one equivalent of 5 with 0.7 equivalents of chr 1 and 0.3 equivalents of meta-toluidine diethanolamine. Yield=92%, Mw=9000, Tg=169° C.

Example 8

Synthesis of PEI 7.

This example relates to the synthesis of a crosslinkable polyesterimide in which maleimide reactive functional groups are placed at a chain end. It is the polyester-imide PEI 4 synthesized with a slight excess of chromophore Chr 2, in order to obtain a polymer terminating in alcohol finctional groups which are reacted with maleimidobenzoic chloride.

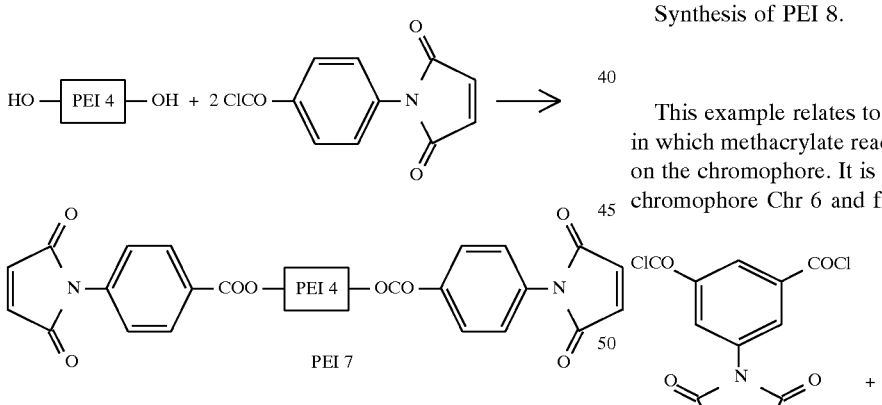

In solution in dimethylacetamide 2 g of Chr 2 are reacted with 3.36 g of the acid dichloride 7 (0.8 equivalents) in the presence of a stoichiometric quantity of pyridine at 60° C. for 6 h. 425 mg of maleimidobenzoic chloride and an equimolar quantity of pyridine are then added and allowed to react at ambient temperature for 16 h. The polymer is recovered by precipitation into methanol, filtration and vacuum-drying at 40° C. for 12 h. Yield=85%, Tg=182, Mw=8000.

After 1 h at 210° C. the Tg of the polymer is 205° C. and the polymer is insoluble in tetrahydrofuran, dimethylacetamide and N-methylpyrrolidone. A 2-micron thick film of this polymer is obtained by spin-coating and after a heat treatment at 210° C. for 1 h the film becomes insoluble in dimethylacetamide.

Thermal crosslinking of PEI 7 at 160° C. for 1 h and 220° C. for 30 min in the presence of 5 mass % of pentaerythritol triacrylate gives, as above, an insoluble matrix.

Exmaple 9

Synthesis of PEI 8.

This example relates to the synthesis of a polyesterimide in which methacrylate reactive functional groups are placed on the chromophore. It is the polymer synthesized from the chromophore Chr 6 and from the acid dichloride 8.

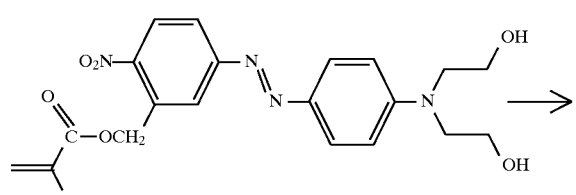

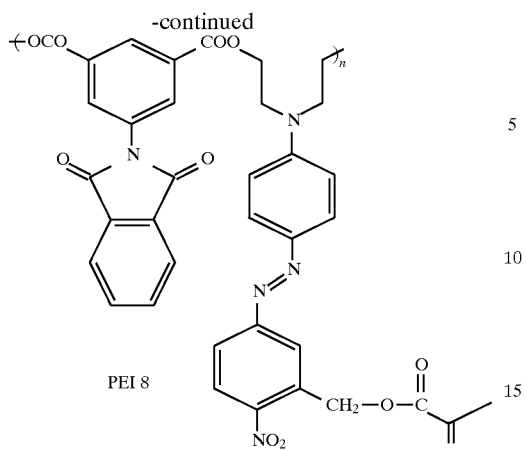

PEI 8

2 g of Chr 8 are reacted, in solution in dioxane, with one molar equivalent of 8 in the presence of two equivalents of pyridine at 50° C. with stirring for 3 h. The polymer is recovered by precipitation into methanol, filtration and vacuum-drying at 30° C. for 24 h. Yield=96%, Mw=6500.

The polymer in solution in dimethylacetamide (30% by weight) is deposited by spin-coating on a glass sheet and then dried at 50° C. for 6 h. After a heat treatment at 200° C. for 2 h the polymer is insoluble in dimethylacetamide and tetrahydrofuran.

Example 10

Film-Forming, Polarization and Electro-Optical Characterization of the Polymer PEI 1.

PEI 1 of Example 1 is dissolved in dimethylacetamide under nitrogen atmosphere (mass concentration of 30%). The solution is filtered on a 0.2-micron PTFE filter and then converted into film by the spin-coating technique (1500 rev/min) on a glass substrate (Corning® 7059). The film is vacuum-dried at 150° C. for 2 h and then at 250° C. for 2 h. A film of approximately 2 microns is obtained. The refractive index is obtained by the method of coupling of the modes of a light beam in the film on a Metricon 2010 apparatus. It is 1.736 at 815 nm and 1.681 at 1300 nm. The optical losses are obtained by the sliding prism method (according to Weber et al., Appl. Opt., 1973, 12, 755 and Franke et al., SPIE, vol. 682, 1986, 191). An optical attenuation of the order of 0.8 is measured at 1.5 dB/cm at 1300 and 1550 nm.

For characterizations in nonlinear optics the film (2.6 microns) is deposited, as above, on glass covered with a 200-angstrom gold coating and, after drying, a second gold layer is deposited on the upper face of the film and constitutes the second polarization electrode. The metallized film is introduced into an optical chamber maintained under nitrogen atmosphere. The film is then heated to 175° C. and a direct polarizing voltage E of 260 volts is applied for 1 h. The sample is then cooled to ambient temperature while the polarizing voltage is maintained. The electrooptical coefficient $r_{33}$ of the film is then measured in the optical chamber by Fabry-Perot interferometry. This technique is described in detail by Meyrueix et al. in "Non Linear Optics", vol. 1, p. 201, 1991. With E=30 and 260 V, $r_{33}$ values equal to 1.7 and 14 pm/V respectively are measured at a wavelength of 1320 mm. The stability of this electrooptical coefficient is excellent, the decrease in $r_{33}$ is not measurable at 20° C. and, at 125° C., $r_{33}$ decreases by 10% in 50 h.

We claim:

1. A process for the preparation of a polyesterimide which is transparent or active in nonlinear optics, and which contains at least one chromophore, which comprises performing a polyesterification with the aid of comonomers of which at least one contains at least one imide unit of formula:

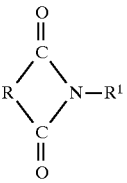

in which:

R is an aromatic group, a linear or branched alkyl group, a cycloalkyl group, a linear or branched alkenyl group or a cycloalkenyl group, a linear or branched alkyne group or a cycloalkynyl group, and wherein said groups may be substituted, and $R^1$ denotes an aliphatic group, an alicyclic group or an aromatic group.

2. Process of preparation according to claim 1, wherein at least one of the comonomers is or contains a chromophore represented by the schematic formula DπA, in which D=electron-donor group. A=electron-acceptor group, and π=transmitter group with delocalized π electrons.

3. Process according to claim 1, wherein at least one comonomer is used containing at least one crosslinking group GR or at least one crosslinking group GR is grafted on to at least one of the starting comonomers in a preliminary stage, or subsequently onto the polymer, the said groups GR being, finally, located:

either within the polymer chains, or laterally (pendant GR) relative to the polymer chains, or on at least one of the ends of the polymer chains, and wherein these GR are identical or different from each other on a given polymer chain.

4. Process according to claim 1, wherein the polymer obtained is subjected to a postpolymerization treatment consisting in heating to a temperature higher than or equal to 100° C.

5. Polyesterimide as obtained by the process according to claim 1 for use in linear optics or in nonlinear optics, which contains ester repeat functional groups E=—CO—O—, imide recurrent units I of the following formula:

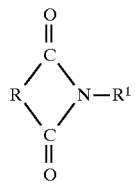

in which:

R is an aromatic group, a linear or branched alkyl group, a cycloalkyl group, a linear or branched alkenyl group or a cycloalkenyl group, a linear or branched alkyne group or a cycloalkynyl group, wherein said groups may be substituted, and $R^1$ denotes an aliphatic group, an alicyclic group or an aromatic group, and at least one chromophore, and wherein said polyesterimide is free from amide functional groups which result in ring closure to imides.

6. Polyesterimide according to claim 1 having a recurrent unit corresponding to the following schematic formula Fg:

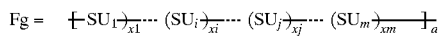

$m = 1$,
$\Sigma_{xi} = 1 (i = 1 \text{ to } m)$,
$n \geq 1$, in which the $SU_i$ (i=1 to m) are chemical sequences formed by elementary units selected from the group consisting of: I, DπA, E and $R^r$, and all of the subunits constituting the recurrent unit containing at least one ester functional group E, at least one imide functional group I, at least one chromophore DπA and, optionally, at least one filling radical $R^r$ consisting of a hydrocarbon group.

7. A polyesterimide according to claim 6, wherein the subunits $(SU_i)_{xi}$ (i=1 to m) are selected from the group consisting of the following three classes of chemical sequences:

A=E.DπA.E.I,
B=E.DπA.E.$R^r$,
C=E.$R^r$.E.I.

8. A polyesterimide according to claim 5 which contains crosslinking groups GR, wherein GR is selected from the group consisting of reactive groups containing one double bond, reactive groups containing one triple bond, and reactive groups containing one strained ring of the cyclobutene or epoxy and derivatives thereof.

9. Polyesterimide according to claim 8, wherein the groups GR contain at least one of the subunits $(SU_i)_{xi}$, or at least one of the ends of the polymer chains.

10. Polyesterimide according to claim 8, wherein GR is bonded to at least one imide functional group (I) or at least one chromophore DπA.

11. Polyesterimide according to claim 8 wherein the crosslinks groups GR can react with at least one crosslinking auxiliary.

12. Polyesterimide according to claim 5, wherein its molecular mass is greater than or equal to 1000 D.

13. Polyesterimide for use in linear optics or in nonlinear optics, including at least one chromophore, which is derived from the polyesterification of comonomers of which at least one contains at least one imide unit which is free from amide functional groups which result in ring closure to imides.

14. Polyesterimide according to claim 13, wherein at least one of the comonomers is or contains the chromophore represented by the schematic formula DπA wherein D=electron donor group, A=electron acceptor group, and π=transmitter group with delocalized π electrons.

15. A polyesterimide according to claim 6 which is a homopolymer consisting of a recurrent unit in which $S_1$ is of the sequence E.DπA.E.I. with each occurring DπA being identical and each occurring I being identical.

16. A polyesterimide according to claim 7 which consists of a copolymer in which the recurrent unit contains at least two different subunits $(SU_i)_{xi}$, $(SU_j)_{xj}$, having sequences A(AA'), AB, AC, or BC; or at least three different subunits $(SU_i)_{xi}$, $(SU_j)_{xj}$, $(SU_k)_{xk}$ having sequences ABC.

17. A polyesterimide according to claim 7, wherein the recurrent units contain at least one subunit $(SU_i)_{Xi}$ having DπA (A or B) and wherein Xi is greater than or equal to 0.5.

18. A polyesterimide according to claim 7, wherein the recurrent units contain at least one subunit $(SU_i)_{Xi}$ having DπA (A or B) and wherein Xi is greater than or equal to 0.15.

19. A polyesterimide according to claim 7, wherein the recurrent units contain at least one subunit $(SU_i)_{Xi}$ having DπA (A or B) and wherein Xi is greater than or equal to 0.3.

20. A polyesterimide according to claim 5 wherein its molecular mass is from about 1000 to about 200,000 D.

21. A polyesterimide according to claim 5 wherein its molecular mass is from about 3000 to about 70,000 D.

22. A device for linear optics or nonlinear optics, which is produced, at least in part, with at least one polyesterimide by the process according to claim 1.

23. A device for linear optics or nonlinear optics, which is produced, at least in part, with at least one polyesterimide according to claim 5.

24. Process of claim 1, wherein the comonomer contains one or two units of the formula defined in claim 1.

25. Process of claim 4, wherein the temperature is about 120° C.

26. Process of claim 4, wherein the temperature is between 180° C. and 350° C.

27. Process of claim 26 which is performed under vacuum.

28. A polyesterimide according to claim 6, wherein $R^r$ is selected from the group consisting of alkyl, cycloalkyl, aryl, alkenyl, alkynyl, cycloalkenyl, cycloalkynyl and aromatic groups.

* * * * *